United States Patent
Bharghavan et al.

(10) Patent No.: US 9,142,873 B1
(45) Date of Patent: Sep. 22, 2015

(54) WIRELESS COMMUNICATION ANTENNAE FOR CONCURRENT COMMUNICATION IN AN ACCESS POINT

(75) Inventors: Vaduvur Bharghavan, Morgan Hill, CA (US); Rajendran Venugopalachary, Cupertino, CA (US); Srinivas Sivaprakasam, Milpitas, CA (US)

(73) Assignee: Meru Networks, Sunnyvale, CA (US)

( * ) Notice: Subject to any disclaimer, the term of this patent is extended or adjusted under 35 U.S.C. 154(b) by 990 days.

(21) Appl. No.: 12/496,426

(22) Filed: Jul. 1, 2009

Related U.S. Application Data (63) Continuation-in-part of application No. 11/294,673, filed on Dec. 5, 2005, now Pat. No. 8,160,664, and a continuation-in-part of application No. 11/715,287, filed on Mar. 7, 2007, now Pat. No. 7,826,426, and a (Continued)

(51) Int. Cl.
  *H04J 3/16* (2006.01)
  *H01Q 1/08* (2006.01)
  *H04L 29/06* (2006.01)

(52) U.S. Cl.
  CPC .......... *H01Q 1/084* (2013.01); *H04L 29/06163* (2013.01)

(58) Field of Classification Search
  CPC .... H01Q 1/084; H04B 7/0689; H04B 7/0871; H04L 29/06163; H04L 45/52
  USPC .......... 370/334, 338; 455/11.1, 25, 63.4, 561, 455/562.1, 575.7; 343/757, 761, 882, 893
  See application file for complete search history.

(56) References Cited

U.S. PATENT DOCUMENTS

| | | | |
|---|---|---|---|
| 3,956,749 | A | 5/1976 | Magorian |
| 5,038,151 | A | 8/1991 | Kaminski |
| 5,125,108 | A | 6/1992 | Talwar |

(Continued)

FOREIGN PATENT DOCUMENTS

| JP | 2005311580 | 11/2005 |
|---|---|---|
| JP | 2006229972 | 8/2006 |

OTHER PUBLICATIONS

Habib et al. "Multi-antenna techniques for OFDM based WLAN." Proceedings of First International Conference on Next-Generation Wireless Systems, Jan. 2006, pp. 186-190.

(Continued)

*Primary Examiner* — Hoang-Chuong Vu
(74) *Attorney, Agent, or Firm* — Law Office of Dorian Cartwright (57) ABSTRACT

One or more access points in a wireless communication system, wherein at least one of those access points includes a set of more than one antennae capable of concurrent communication, and at least one of those more than one antennae is isolated from a remainder of that set of antennae during concurrent communication. Isolation includes one or more of disposed a first antenna in a null region of a second antenna, disposing a first antenna to communicate polarized and substantially orthogonal to a second antenna, disposing a set of antennae to communicate at two or more carrier frequencies, wherein each first antenna adjacent to a second antenna operate at distinct such carrier frequencies, or disposing a set of antennae to communicate using two or more substantially distinct protocols, wherein substantially each first antenna adjacent to a second antenna operate at substantially distinct such protocols.

17 Claims, 8 Drawing Sheets

Related U.S. Application Data continuation-in-part of application No. 12/465,537, filed on May 13, 2009, now Pat. No. 8,344,953.

(60) Provisional application No. 61/077,403, filed on Jul. 1, 2008.

(56) References Cited

U.S. PATENT DOCUMENTS

| | | | | |
|---|---|---|---|---|
| 5,177,788 | A | 1/1993 | Schanning et al. | |
| 5,337,397 | A | 8/1994 | Lebby et al. | |
| 5,519,706 | A | 5/1996 | Bantz et al. | |
| 5,884,272 | A | 3/1999 | Walker et al. | |
| 5,966,094 | A | 10/1999 | Ward et al. | |
| 6,023,621 | A * | 2/2000 | Jackson et al. | 455/452.2 |
| 6,658,047 | B1 | 12/2003 | Komulainen et al. | |
| 6,728,603 | B2 | 4/2004 | Pruzan et al. | |
| 6,760,318 | B1 | 7/2004 | Bims | |
| 6,788,658 | B1 | 9/2004 | Bims | |
| 6,839,038 | B2 | 1/2005 | Weinstein | |
| 6,877,043 | B2 | 4/2005 | Mallory et al. | |
| 6,894,649 | B2 | 5/2005 | Ostervall | |
| 6,933,909 | B2 | 8/2005 | Theobold | |
| 6,950,629 | B2 | 9/2005 | Nagy | |
| 6,954,177 | B2 | 10/2005 | Channabasappa et al. | |
| 6,978,158 | B2 | 12/2005 | Ghavami | |
| 6,999,802 | B2 | 2/2006 | Kim | |
| 7,057,566 | B2 * | 6/2006 | Theobold | 343/702 |
| 7,171,215 | B2 | 1/2007 | Khouaja et al. | |
| 7,194,008 | B2 | 3/2007 | Chu et al. | |
| 7,197,308 | B2 | 3/2007 | Singhal et al. | |
| 7,277,728 | B1 | 10/2007 | Kauhanen | |
| 7,319,685 | B2 | 1/2008 | Kim et al. | |
| 7,333,455 | B1 | 2/2008 | Bolt et al. | |
| 7,359,362 | B2 | 4/2008 | King et al. | |
| 7,400,604 | B2 | 7/2008 | Lee et al. | |
| 7,403,506 | B2 | 7/2008 | Lee et al. | |
| 7,406,319 | B2 | 7/2008 | Kostic et al. | |
| 7,420,942 | B2 * | 9/2008 | Wang | 370/329 |
| 7,426,388 | B1 * | 9/2008 | Wright et al. | 455/431 |
| 7,430,397 | B2 | 9/2008 | Suda et al. | |
| 7,433,722 | B2 | 10/2008 | Sakamoto et al. | |
| 7,466,981 | B1 | 12/2008 | Abdelhamid et al. | |
| 7,499,673 | B2 * | 3/2009 | Saliga et al. | 455/63.4 |
| 7,515,909 | B2 | 4/2009 | Jain et al. | |
| 7,555,287 | B1 | 6/2009 | Heinonen et al. | |
| 7,630,402 | B2 | 12/2009 | Un et al. | |
| 7,693,513 | B2 | 4/2010 | Chou | |
| 7,826,426 | B1 | 11/2010 | Bharghavan et al. | |
| 7,843,910 | B2 | 11/2010 | Loughran et al. | |
| 8,027,637 | B1 | 9/2011 | Bims | |
| 8,090,374 | B2 * | 1/2012 | Rezvani et al. | 455/437 |
| 8,472,359 | B2 | 6/2013 | Bharghavan et al. | |
| 2002/0022483 | A1 | 2/2002 | Thompson et al. | |
| 2002/0060995 | A1 | 5/2002 | Cervello et al. | |
| 2002/0086640 | A1 * | 7/2002 | Belcher et al. | 455/63 |
| 2002/0112008 | A1 | 8/2002 | Christenson et al. | |
| 2002/0147031 | A1 * | 10/2002 | Hood, III | 455/562 |
| 2002/0181629 | A1 * | 12/2002 | Shibata | 375/347 |
| 2003/0162546 | A1 | 8/2003 | Jordan | |
| 2003/0198305 | A1 | 10/2003 | Taylor et al. | |
| 2003/0199247 | A1 * | 10/2003 | Striemer | 455/11.1 |
| 2003/0206532 | A1 | 11/2003 | Shpak | |
| 2003/0206535 | A1 | 11/2003 | Shpak | |
| 2003/0207697 | A1 | 11/2003 | Shpak | |
| 2003/0207698 | A1 | 11/2003 | Shpak | |
| 2003/0207699 | A1 | 11/2003 | Shpak | |
| 2003/0236103 | A1 | 12/2003 | Tamaki et al. | |
| 2004/0051668 | A1 * | 3/2004 | Chang | 343/702 |
| 2004/0063455 | A1 | 4/2004 | Eran et al. | |
| 2004/0121770 | A1 | 6/2004 | Tigerstedt et al. | |
| 2004/0141617 | A1 | 7/2004 | Volpano | |
| 2004/0156399 | A1 | 8/2004 | Eran | |
| 2004/0183726 | A1 * | 9/2004 | Theobold | 343/700 MS |
| 2004/0185904 | A1 | 9/2004 | Yamakita | |
| 2004/0235453 | A1 | 11/2004 | Chen et al. | |
| 2005/0054370 | A1 | 3/2005 | Shpak | |
| 2005/0111405 | A1 | 5/2005 | Kanterakis | |
| 2005/0122919 | A1 | 6/2005 | Touag | |
| 2005/0135321 | A1 * | 6/2005 | Sharony | 370/342 |
| 2005/0152314 | A1 | 7/2005 | Sun et al. | |
| 2005/0153713 | A1 * | 7/2005 | Sharony | 455/456.5 |
| 2005/0156794 | A1 * | 7/2005 | Theobold et al. | 343/702 |
| 2005/0156799 | A1 * | 7/2005 | Theobold | 343/725 |
| 2005/0195110 | A1 | 9/2005 | Lin et al. | |
| 2005/0219143 | A1 * | 10/2005 | Schadler et al. | 343/893 |
| 2005/0220048 | A1 | 10/2005 | Lee et al. | |
| 2005/0238054 | A1 | 10/2005 | Sharma | |
| 2005/0261970 | A1 | 11/2005 | Vucina et al. | |
| 2006/0002331 | A1 | 1/2006 | Bhagwat et al. | |
| 2006/0025127 | A1 | 2/2006 | Cromer et al. | |
| 2006/0049987 | A1 | 3/2006 | Herrick | |
| 2006/0056443 | A1 | 3/2006 | Tao et al. | |
| 2006/0098613 | A1 | 5/2006 | Kish et al. | |
| 2006/0111112 | A1 | 5/2006 | Maveddat | |
| 2006/0132360 | A1 * | 6/2006 | Caimi et al. | 343/700 MS |
| 2006/0215691 | A1 | 9/2006 | Kobayashi et al. | |
| 2006/0221993 | A1 | 10/2006 | Liao et al. | |
| 2006/0281500 | A1 * | 12/2006 | Huang et al. | 455/575.1 |
| 2007/0014267 | A1 | 1/2007 | Lam et al. | |
| 2007/0026807 | A1 | 2/2007 | Kish | |
| 2007/0117514 | A1 * | 5/2007 | Gainey et al. | 455/63.4 |
| 2007/0165610 | A1 | 7/2007 | Tseng et al. | |
| 2007/0195725 | A1 | 8/2007 | Iino et al. | |
| 2007/0213071 | A1 | 9/2007 | Hwang | |
| 2008/0014956 | A1 | 1/2008 | Balasubramanian | |
| 2008/0102835 | A1 | 5/2008 | Zhao et al. | |
| 2008/0112373 | A1 | 5/2008 | Shpak | |
| 2008/0153497 | A1 | 6/2008 | Kalhan | |
| 2008/0165866 | A1 | 7/2008 | Teo et al. | |
| 2008/0167093 | A1 * | 7/2008 | Nagano et al. | 455/575.3 |
| 2008/0212535 | A1 | 9/2008 | Karaoguz et al. | |
| 2008/0242305 | A1 | 10/2008 | Kahlert et al. | |
| 2008/0287130 | A1 | 11/2008 | Laroia et al. | |
| 2009/0022127 | A1 | 1/2009 | Traynor et al. | |
| 2009/0023434 | A1 * | 1/2009 | Trainor et al. | 455/418 |
| 2009/0061873 | A1 | 3/2009 | Bao et al. | |
| 2009/0061879 | A9 | 3/2009 | Gallagher et al. | |
| 2009/0111472 | A1 | 4/2009 | Promenzio | |
| 2009/0252165 | A1 | 10/2009 | Zhang et al. | |
| 2010/0080151 | A1 * | 4/2010 | Proctor et al. | 370/279 |
| 2011/0040969 | A1 | 2/2011 | Yao et al. | |
| 2011/0188484 | A1 | 8/2011 | Reznik et al. | |
| 2011/0305217 | A1 | 12/2011 | Seok | |
| 2012/0307792 | A1 | 12/2012 | Ram et al. | |
| 2012/0314696 | A1 | 12/2012 | Liu | |
| 2012/0317619 | A1 | 12/2012 | Dattagupta et al. | |
| 2013/0148609 | A1 | 6/2013 | Ram et al. | |
| 2013/0188539 | A1 | 7/2013 | Han et al. | |
| 2014/0112322 | A1 | 4/2014 | Ram et al. | |
| 2014/0126466 | A1 | 5/2014 | Hamdi et al. | |

OTHER PUBLICATIONS

Kitahara et al. "A base station adaptive antenna for downlink transmission in a DS-CDMA system." IEEE 51st Vehicular Technology Conference Proceedings, 2000 (Abstract).

Mahler et al. Design and optimisation of an antenna array for WiMAX base stations. IEEE/ACES International Conference on Wireless Communications and Applied Computational Electromagnetics, 2005 (Abstract).

Miaris et al. "On the base stations antenna system design for mobile communications." Electrical Engineering, 2006, pp. 157-163, vol. 88.

Miura et al. "Study of array pattern tuning method using hybrid genetic algorithms for figure-8 satellite's earth station antenna." Asia-Pacific Microwave Conference Proceedings, 2000 (Abstract).

Ponnapalli et al. "Design and packaging of antennas for wireless systems." Proceedings of Electrical Performance of Electrical Packaging, 1995 (Abstract).

Sarolic. "Base station antenna near-field radiation pattern distortion analysis." Sixth International Conference on Computational Methods for the Solution of Electrical and Electromagnetic Engineering (56) References Cited

OTHER PUBLICATIONS

Problems Incorporating Electromagnetic Effects on Human Beings and Equipment Seminar, 2003 (Abstract).
Amir. "Fast Handoff for Seamless Wireless Mesh Networks." MobiSys '06, Jun. 19-22, 2006, pp. 83-95, ACM, Uppsala, Sweden.
Business Wire. "Meru Networks Delivers Industry's Only Zero-Loss Mobility Across WLAN Access Points and IP Subnets." Jun. 21, 2004, pp. 1-2.
Chen et al. "A Seamless Handoff Mechanism for OHCP-Based IEEE 802.11 WLANS." IEEE Communications Letters, Aug. 2007, pp. 665-667, vol. 1, No. 8.
Cheung et al. "Network Configurations for Seamless Support of COMA Soft Handoffs Between Cell Clusters." IEEE Journal on Selected Areas in Communications, Sep. 1997, pp. 1276-1278, vol. 15, No. 7.
Chou et al. "Intelligent Agent Over WLAN With Seamless Handover and Load Balancing." 2006 International Conference on Communication Technology, Nov. 27-Nov. 30, 2006, pp. 1-7, IEEE. (Abstract).
Chui et al. "An Access Point Coordination System for Improved VoIP/WLAN Handover Performance." IEEE, 2006, pp. 501-505.
Fan et al. "Managing Heterogeneous Access Networks." 32nd IEEE Conference on Local Computer Networks, 2007, pp. 651-658, IEEE 2007, pp. 651-658.
Finneran. "Can WLAN switches support voice? Today's controllers offer key security and QoS capabilities, but as always, the devil's in the details." Business Communications Review, Oct. 2006, pp. 42-47.
Huang et al. "Incorporating AP Selection and Call Admission Control for Seamless Handoff Procedure." Proceedings of the International Conference on Computer and Communication Engineering 2008, pp. 823-826.
Huang et al. "SAP: Seamless Authentication Protocol for Vertical Handoff in Heterogeneous Wireless Networks." Third International Conference in Heterogeneous Wired/Wireless Networks, Aug. 7-9 2006, pp. 1-10, Waterloo, ON, CA.
Hur et al. "A Distributed-Request-Based Diffserv CAC for Seamless Fast-Handoff in Mobile Internet." J. Sole-Pareta et al. (Eds.): Q of IS 2004: International Workshop on Quality of Future Internet Services, LNCS 3266, pp. 184-193, 2004.
IEEE Std 802. 11-1997 Information Technology—telecommunications and Information exchange between systems—Local and Metropolitan Area Networks—specific Requirements—part 11: Wireless Lan Medium Access Control (MAC) and Physical Layer (PHY) Specifications, IEEE Std 802.11-1997, vol., no., pp. i-445, Nov. 18, 1997.
IEEE. "Part 11: Wireless LAN Medium Access Control (MAC) and Physical Layer (PHY) specifications." IEEE Std. 802.11, 1999 Edition (R2003), 2003, vol. No. pp. i-513.
Jang et al. "Mobility Support Algorithm Based on Wireless 802.11 b LAN for Fast Handover." 5th International Conference, PDCAT 2004, Dec. 8-10, 2004, pp. 715-718, Springer Verlag. (Abstract).
Zhou et al. "A Seamless Handoff Scheme for Mobile IP." 2006 IEEE 63rd Vehicular Technology Conference, VTC 2006-Spring, May 7-Jul. 10, 2006, pp. 927-931, IEEE. (Abstract).
Kist. "Instant Handoffs for Wireless Infrastructure Meshed Networks." Proceedings of the 2008 Australasian Telecommunication Networks and Applications Conference, 2008, pp. 288-293.
Liao et al. "Practical Schemes for Smooth MAC Layer Handoff in 802.11 Wireless Networks." Proceedings of the 2006 International Symposium on a World of Wireless, Mobile and Multimedia Networks. IEEE, 2006, pp. 1-10.
Lv. "Intelligent Seamless Vertical Handoff Algorithm for the Next Generation Wireless Networks." Mobilware '08, Feb. 12-15, 2008, pp. 1-10, Innsbruck, Austria.
Mannion. "Foundry Networks enters WLAN management fray—Bets on integration with wired infrastructure, market timing to take on Cisco." Electronic Engineering Times, Sep. 8, 2003, p. 32, No. 1286.
Manodham. "A Seamless Handoff Scheme with New AP Module for Wireless LANs Support VoIP." 2006. International Symposium on Applications and the Internet, SAINT 2006, Jan. 23-27, 2006, pp. 253-258, IEEE. (Abstract).
Manodham et al. "A Seamless Handoff Scheme with New AP Module for Wireless LANs support VoIP." Proceedings of the 2005 Symposium on Applications and the Internet, 2006, pp. 1-6, IEEE.
Marsh. "Power and wireless options extend Ethernet's reach: Ethernet's power-delivery and wireless abilities offer new application potential that hugely extends the reach of the IEEE's 802.X series of standards." EDN, Nov. 11, 2004, p. 67, Reed Business Information.
Miaris et al. "On the base stations antenna system design for mobile communications." Electrical Engineering, 2006, vol. 88, pp. 157-163.
Murray et al. "Intelligent Access and Mobility Management in Heterogeneous Wireless Networks Using Policy." ACM First International Workshop on Information and Communication Technologies, 2003, pp. 181-186.
Rist et al. "Wireless Lans—Look, Ma . . . No Wires—Wireless networking products prove they are finally ready for prime time." Internetweek, Mar. 20, 2000, p. 41, No. 805, CMP Media, Inc.
Sattari et al. "Seamless Handover Between WLAN and UMTS." 2004 IEEE 59th Vehicular Technology Conference, VTC2004-Spring: Towards a Global Wireless World, May 17-19, 2004, pp. 3035-3038, IEEE. (Abstract).
Thomsen. "Development Platform for Dynamic Bandwidth Allocation Schemes in Future MPCP Enabled Ethernet Passive Optical Network (EPON)." WSEAS Transactions on Communications, Apr. 5, 2006, pp. 92-98, WSEAS. (Abstract).
Wei et al. "Seamless Handoff Support in Wireless Mesh Networks." 2006, pp. 1-8, IEEE.
Xhafa et al. "Seamless Handover in Building Using HVAC Ducts: A New System Architecture." IEEE Global Telecommunications Conference GLOBECOM'03, Dec. 1-5, 2003, pp. 3093-3097, IEEE. (Abstract).
Yaakob et al. "An Integration of Mobile Motion Prediction with Dedicated Solicitation Message for Seamless Handoff Provisioning in High Speed Wireless Environment." 2008 International Conference on Electronic Design, Dec. 1-3, 2008, Pernang, Malaysia, pp. 1-5.
Yamagata et al. "Seamless Handover for Hotspot Network Using Adaptive Flow Control Method." 2005 Asia-Pacific Conference on Communications, Oct. 3-5, 2005, pp. 502-506, IEEE. (Abstract).
Zhou et al. A Seamless Handoff Scheme for Mobile IP. IEEE Vehicular Technology Conference, 2006, pp. 927-931, vol. 2.

\* cited by examiner

WIRELESS COMMUNICATION ANTENNAE FOR CONCURRENT COMMUNICATION IN AN ACCESS POINT

RELATED APPLICATIONS

This application claims priority of the following documents, sometimes collectively referred to herein as the "incorporated disclosures". Each of these documents forms a part of this disclosure, and is hereby incorporated by reference as if fully set forth herein.

U.S. patent application Ser. No. 11/294,673, filed Dec. 5, 2005, in the names of inventors Rajendran Venugopalachary, Senthil Palanisamy, Srinith Sarang, and Vaduvur Bharghavan, and assigned to the same assignee, titled "Omni-Directional Antenna Supporting Simultaneous Transmission and Reception of Multiple Radios with Narrow Frequency Separation", now pending.

U.S. patent application Ser. No. 11/715,287, filed Mar. 7, 2007, in the names of inventors Vaduvur Bharghavan, Sung-Wook Han, Joseph Epstein, Berend Dunsbergen, and Saravanan Balusubramanian, and assigned to the same assignee, titled "Seamless Mobility in Wireless Networks", now pending.

U.S. Provisional patent application Ser. No. 12/465,537, filed May 13, 2009, in the names of inventors Sid Gilbrech, Rajendran Venugopalachary, and Srinivas Sivaprakasam, and assigned to the same assignee, titled "Omni-Directional Flexible Antenna Support Panel", now pending.

U.S. Provisional Patent Application No. 61/077,403, filed Jul. 1, 2008, in the names of inventors Rajendran Venugopalachary, Srinivas Sivaprakasam, and Vaduvur Bharghavan, assigned to the same assignee, titled "Access Point Antenna Array System", now pending.

SUMMARY OF THE DESCRIPTION

In some wireless communication systems, wireless stations ("WS's") communicate with access points ("AP's"), which themselves communicate either with each other (such as for communication between wireless stations within the wireless communication system), or with an external communication port (such as for communication between wireless stations and devices outside the wireless communication system). This has the effect that access points and wireless stations contend with each other for communication bandwidth.

One known solution includes increasing the number of radios and channels available to each access point, with the effect that each access point has more communication bandwidth available. For example, the MIMO aspects of IEEE standard 802.11n allow access points to pairwise communicate using multiple channels, each having its own spatial path for coupling EMF (electromagnetic fields). While this solution can sometimes achieve additional communication bandwidth capacity between pairs of access points, it has at least the drawback that communicated signals might interfere at either the sender or the receiver.

DETAILED DESCRIPTION

Generality of the Description

Read this application in its most general possible form. For example and without limitation, this includes:

References to specific techniques include alternative, further, and more general techniques, especially when describing aspects of this application, or how inventions that might be claimable subject matter might be made or used.

References to "preferred" techniques generally mean that the inventors contemplate using those techniques in one or more inventions that might be claimable subject matter, and thinks are best—in ordinarily contemplated circumstances—for one or more intended uses thereof. This does not exclude other techniques, whether explicitly mentioned or not, and does not mean that those "preferred" techniques are critical or essential, or that they would be preferred in alternative, further, and more general circumstances.

References to contemplated causes or effects, e.g., for some described techniques, do not preclude alternative, further, or more general causes or effects, that might occur in alternative, further, or more general described techniques.

References to one or more reasons for using particular techniques, or for avoiding particular techniques, do not preclude other reasons or techniques, even if completely contrary, where circumstances might indicate that the stated reasons or techniques might not be as applicable as the described circumstance.

Moreover, the invention is not in any way limited to the specifics of any particular example devices or methods, whether described herein in general or as examples. Many other and further variations are possible which remain within the content, scope, or spirit of the inventions described herein. After reading this application, such variations would be clear to those of ordinary skill in the art, without any need for undue experimentation or new invention.

Terms and Phrases

The general meaning of terms and phrases used herein is intended to be illustrative, and not in any way limiting.

The terms "antenna", "antennae", and the like, generally refer to any device or technique using which a wireless station is capable of receiving or sending information in a wireless communication system without a physical electromagnetic connection to another element in that wireless communication system.

Wireless communication systems are primarily described herein with respect to coupling of EMF's (electromagnetic fields) between sender and receiver. For example and without limitation, many wireless communication systems operate with senders and receivers using modulation onto carrier frequencies of between about 2.4 GHz and about 5 GHz. However, in the context of the invention, there is no particular reason why there should be any such limitation. For example and without limitation, wireless communication systems might operate, at least in part, with vastly distinct EMF frequencies, e.g., ELF (extremely low frequencies), as is sometimes used for communication with submarines, or visible light (e.g., lasers), as is sometimes used for communication with satellites or spacecraft.

In the context of the invention, there is no particular reason why "wireless" communication systems should be limited to EMF techniques. For example and without limitation, a wireless communication system might operate using ultrasonic modulation, i.e., modulating signals onto carriers above the range of normal human hearing, as could be used for ship-to-ship communication in a hostile region, or using infrasonic modulation, i.e., modulating signals onto carriers below range of normal human hearing, as is sometimes suspected to be used by certain relatively large animals (e.g., elephants and cetaceans).

The phrase "access point", the term "AP", and the like, generally refer to any devices capable of operation within a wireless communication system, in which at least some of their communication is potentially with wireless stations. For example and without limitation, an "AP" might refer to a device capable of wireless communication with wireless stations, capable of wire-line or wireless communication with other AP's, and capable of wire-line or wireless communication with a control unit.

For example and without limitation, some examples AP's might communicate with devices external to the wireless communication system (e.g., an extranet, internet, or intranet), using an L2/L3 network. However, in the context of the invention, there is no particular reason why there should be any such limitation. For example and without limitation, one or more AP's might communicate wirelessly, while zero or more AP's might optionally communicate using a wire-line communication link.

The terms "antenna" and "antennae", and the like, generally refer to any devices capable of emitting or receiving electromagnetic fields. When a $1^{st}$ antenna at a sender is coupled to a $2^{nd}$ antenna at a receiver, EMF fields might be coupled and it might be possible to communicate information.

In cases in which one or more devices has an antenna in multiple physical parts, those parts might cooperate to communicate information, e.g., using the MIMO aspects of the IEEE 802.11n standard. In such cases, the individual parts are sometimes referred to herein as "antenna parts", "antennae parts", and the like.

For example and without limitation, the antennae in an arrangement of 9 antennae in a 3×3 square pattern might be selectively allocated, with the effect that a single row or a single column are selectively allocated as antenna parts for a single antenna. This can have the effect that, when each such row of antenna parts is allocated to a single antenna, the three antennae formed in that manner are relatively isolated, at least with respect to MIMO techniques used with the IEEE 802.11n standard.

When antennae include antenna parts selected in a similar manner, this can have the effect that, when each such row of antenna parts is allocated to a single antenna, the three antennae formed in that manner can be relatively isolated, at least with respect to frequency differences, in those cases in which the middle such antenna operates using a substantially different frequency from the outer such antennae.

For example and without limitation, a middle row of an arrangement of three such antennae might use a selected frequency of approximately 2.4 GHz, while the outer two rows of that arrangement might use a selected frequency of approximately 5 GHz, with the effect that each of the three such antennae are substantially isolated from frequency interference.

The term "filter", and the like, generally refer to signal manipulation techniques, whether analog, digital, or otherwise, in which signals modulated onto distinct carrier frequencies can be separated, with the effect that those signals can be individually processed.

In systems in which frequencies both in the approximately 2.4 GHz range and the approximately 5 GHz range are concurrently used, it might occur that a single band-pass, high-pass, or low-pass filter for the approximately 2.4 GHz range is sufficient to distinguish the approximately 2.4 GHz range from the approximately 5 GHz range, but that such a single band-pass, high-pass, or low-pass filter has drawbacks in distinguishing each particular channel within the approximately 2.4 GHz range or has drawbacks in distinguishing each particular channel within the approximately 5 GHz range.

In such cases, a $1^{st}$ set of signal filters might be used to distinguish those channels collectively within the approximately 2.4 GHz range from those channels collectively within the approximately 5 GHz range. A $2^{nd}$ set of signal filters might be used to separately distinguish individual channels within the approximately 2.4 GHz range, while a $3^{rd}$ set of signal filters might be used to separately distinguish individual channels within the approximately 5 GHz range.

For example and without limitation, the $1^{st}$ set of signal filters used to distinguish those channels collectively within the approximately 2.4 GHz range from those channels collectively within the approximately 5 GHz range might have the properties of having relatively wide pass-band range while maintaining a relatively sharp roll-off. The $2^{nd}$ set of signal filters used to separately distinguish individual channels within the approximately 2.4 GHz range and the $3^{rd}$ set of signal filters used to separately distinguish individual channels within the approximately 5 GHz range might each have a relatively narrow pass-band range (e.g., approximately 100 KHz), while maintaining a relatively sharp roll-off.

The phrase "isolation technique", the term "isolate", and the like, generally refer to any device or technique involving reducing the amount of noise perceived on a $1^{st}$ channel when signals are concurrently communicated on a $2^{nd}$ channel. This is sometimes referred to herein as "crosstalk", "interference", or "noise".

Wireless communication systems are primarily described herein with respect to coupling of EMF's between such a $1^{st}$ channel and $2^{nd}$ channel. For example and without limitation, relatively concurrent communication on such a $1^{st}$ channel and $2^{nd}$ channel might result in one or more bits of information being unintelligible or relatively unreliable, with the effect that one or the other, or both, such channels might decide to resend their transmissions with relatively lesser likelihood of data loss.

However, in the context of the invention, there is no particular reason why there should be any such limitation. For example and without limitation, wireless communication systems might encounter crosstalk, interference, or noise, as an effect of disruption of the medium used for communication. For example and without limitation, interference might occur between laser modulation and ultrasonic modulation, due to the possibility of disturbing or heating the air (or other dielectric or sonic medium) by either the $1^{st}$ such signal or the $2^{nd}$ such signal.

The phrase "null region", the term "null", and the like, generally refer to regions in which an operating antenna (or antenna part) has relatively little EMF effect on those particular regions. This has the effect that EMF radiation emitted or received within those regions are often relatively unaffected by EMF radiation emitted or received within other regions of the operating antenna (or antenna part).

The term "radios", and the like, when generally used in the plural in reference to a device or technique, generally refers to (1) devices capable of wireless communication while concurrently using multiple antennae, frequencies, or some other combination or conjunction of techniques, or (2) techniques involving wireless communication while concurrently using multiple antennae, frequencies, or some other combination or conjunction of techniques.

For example and without limitation, the phrase "multiple radios", and the like, might refer to devices and techniques in which multiple signals are encoded for concurrent communication using a CDMA, TDD, or TDMA technique.

The phrase "wireless communication system", and the like, when generally used in reference to devices or techniques, generally refers to (1) devices capable of wireless communication while concurrently using multiple antennae, frequencies, or some other combination or conjunction of techniques, or (2) techniques involving wireless communication while concurrently using multiple antennae, frequencies, or some other combination or conjunction of techniques.

The terms "polarization", "orthogonal", and the like, generally refer to signals having a selected polarization, e.g., horizontal polarization, vertical polarization, right circular polarization, left circular polarization. The term "orthogonal" generally refers to relative lack of interaction between a $1^{st}$ signal and a $2^{nd}$ signal, in cases in which that $1^{st}$ signal and $2^{nd}$ signal are polarized. For example and without limitation, a $1^{st}$ EMF signal having horizontal polarization should have relatively little interaction with a $2^{nd}$ EMF signal having vertical polarization.

For example and without limitation, a $1^{st}$ set of antenna patches, selected for a $1^{st}$ antenna, might have a $1^{st}$ polarization (e.g., horizontal polarization), while a $2^{nd}$ set of antenna patches, selected for a $2^{nd}$ antenna, might have a 2nd polarization (e.g., vertical polarization), with the effect that the $1^{st}$ antenna and the $2^{nd}$ antenna remain relatively isolated.

Although this description is primarily directed to horizontal and vertical polarization, in the context of the invention, there is no particular reason for any such limitation. For example and without limitation, a $1^{st}$ polarization such as described above might be oriented 30° east of a northern axis, while a 2nd polarization such as described above might be oriented 30° south of an eastern axis, with a similar effect of relative isolation.

In such cases in which polarization is used at least in part for isolation, those antenna parts with the $1^{st}$ polarization might be disposed in a center row antenna, while those antenna parts with the $2^{nd}$ polarization might be disposed in the remaining (relatively separated) upper-row and lower-row antennae.

This effect can be combined, at least in part, with the effect noted herein with respect to the phrases "null region", the terms "null", and the like, with the effect that antenna parts might be oriented so that a null region of a $1^{st}$ antenna patch might be disposed within an active region of a $2^{nd}$ antenna patch, or vice versa.

Similarly, this effect can be combined, at least in part, with the effect noted herein with respect to the term "filter" and usage of carrier signals with distinct frequencies. In such cases, those antenna parts using a $1^{st}$ carrier frequency might be disposed in a center row antenna, while those antenna parts using a $2^{nd}$ carrier frequency might be disposed in the remaining (relatively separated) upper-row and lower-row antennae.

The phrase "wireless station", the term "WS" (as well as the phrase "mobile station", the term "MS"), and the like, generally refer to devices capable of operation within a wireless communication system, in which at least some of their communication potentially uses wireless techniques. For example and without limitation, a "WS" might refer to a cellular telephone, a GPS locator, a notebook computer, a transponder, or any other of a wide variety of devices device capable of receiving or sending information without a physical electromagnetic connection to another element in the wireless communication system.

FIGURES AND TEXT

Figure 1:
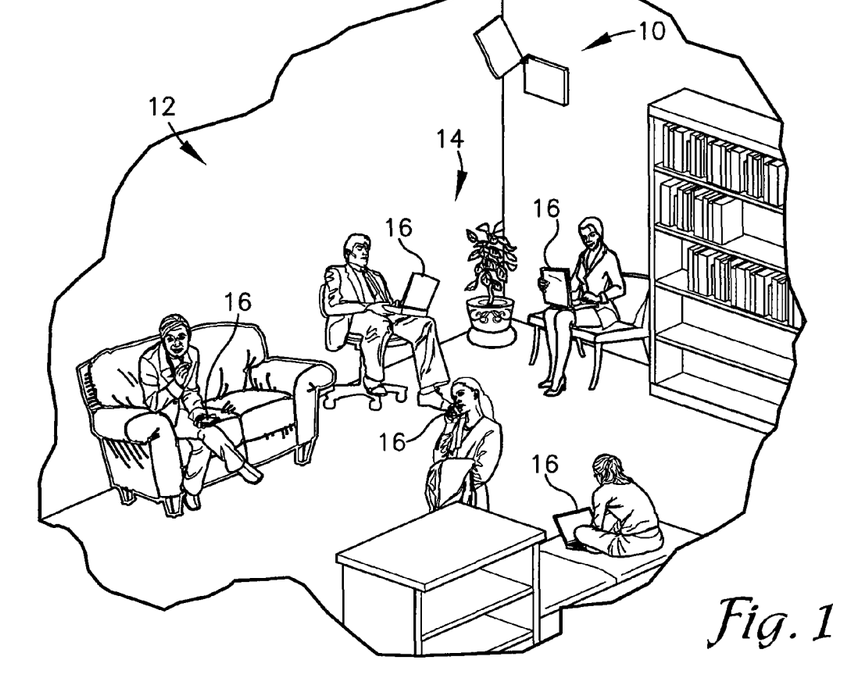
FIG. 1 shows a conceptual diagram of an example wireless communication system.

FIG. 1

FIG. 1 shows a conceptual diagram of an example wireless communication system.

The FIG. 1 shows elements of an example wireless communication system, including at least an antenna array system 10, operating in an environment 12, operating in a wireless communication system 14.

For example and without limitation, the wireless communication system 14 might include a wireless communication network, in which wireless devices 16 can communicate. For example and without limitation, the wireless communication system 14 might use one of, or a variant of, IEEE standard 802.11, possibly including variants thereof, such as for example 802.11a, 802.11b, 802.11g, 802.11n, or any other similar protocol, or variant thereof.

Although this description is primarily directed to networks or systems using IEEE standards 802.11, and variants thereof, in the context of the invention, there is no particular reason for any such limitation.

The environment 12 might include any location where wireless device users might gather, such as for example, an airport, a café, a house, a lecture hall, a library, or the like. Alternatively, the environment 12 might include outdoor settings, such as for example, a college campus, a park, a town square, or the like. Accordingly, distinct environments 12 and the number of users might differ significantly. Each such environment 12 might have substantially distinct physical characteristics affecting communication, such as for example, signal attenuation regions, signal reflecting surfaces, and the like.

The wireless devices 16 might include any electronic device capable of wirelessly sending or receiving information signals, as for example described above. Although this description is primarily directed to EMF signals, and in particular to RF (radio frequency) operation, in the context of the invention, there is no particular reason for any such limitation.

The wireless devices 16 might be mobile, such as for example, a laptop computer. However, other devices that are stationary in normal operation, such as a desktop computer with a wireless network interface card might also be considered wireless devices 16. Hand-held devices, such as cell phones, personal digital assistants (PDAs), palmtop computers, and the like, that include RF transmitters and receivers might also be considered wireless devices 16.

The system 10 might allow more than one wireless device user to concurrently use the network 14.

The system 10 might act to couple wireless devices and a wire-line network 18. The wire-line network 18 might include one or more architectures, protocols, topologies, and the like, such as for example, a local area network, a metro area network, a wide area network, an extranet, an intranet, an internet. The system 10 might couple data from wireless devices to the wired network 18.

Figure 2:
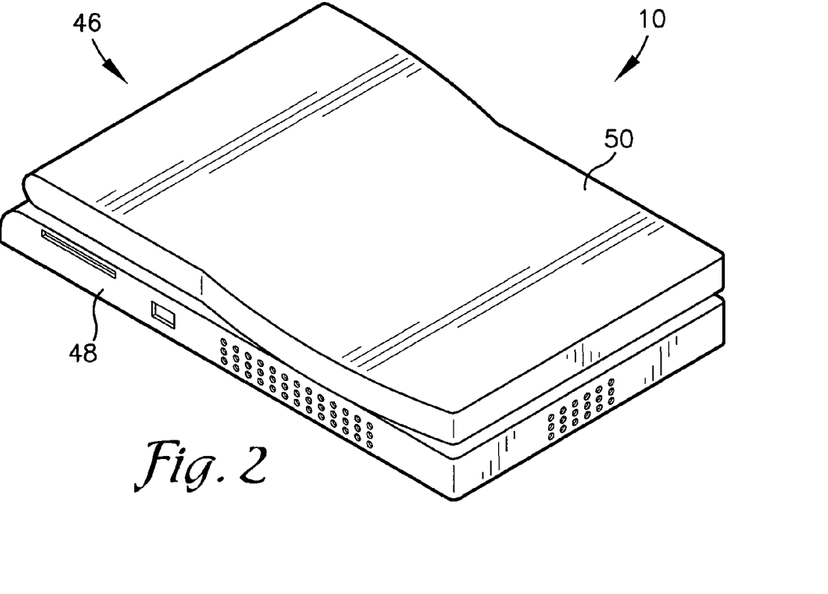
FIG. 2 shows a $1^{st}$ conceptual view of a structure housing a possible access point.

FIG. 2

FIG. 2 shows a $1^{st}$ conceptual view of a structure housing a possible access point.

Figures 3, 4:
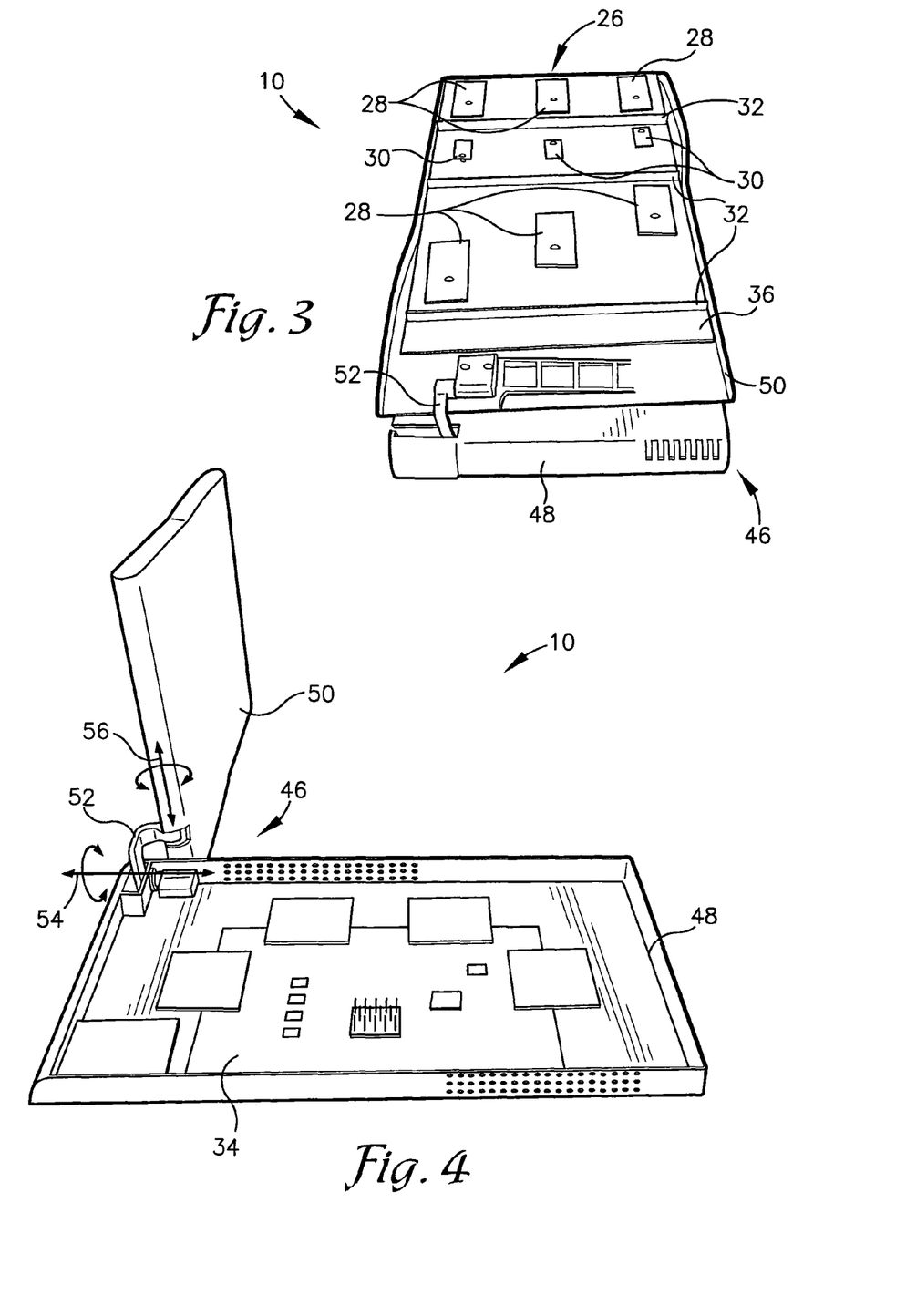
FIG. 3 shows a $2^{nd}$ conceptual view of a structure housing a possible access point.
FIG. 4 shows a $3^{rd}$ conceptual view of a structure housing a possible access point.

As shown in the FIG. 2, the FIG. 3, and the FIG. 4, a possible access point might be housed at least partly within a structure 46, having parts as shown in the figures and including at least a $1^{st}$ enclosure 48, a $2^{nd}$ enclosure 50, and an hinge component 52.

One example of such a structure 46 is shown, at least in part, in U.S. Provisional Application No. 61/052,981, filed May 13, 2008, in the name of inventors Sid Gilbrech, Rajendran Venugopalachary, and Srinivas Sivaprakasam, and assigned to the same assignee, titled "Omni-Directional Flexible Antenna Support Panel", hereby incorporated by reference as if fully set forth herein. The Examiner is requested to take notice that this earlier provisional patent application is incorporated by reference into this regular patent application, by virtue of the claim to priority and incorporation by reference of U.S. application Ser. No. 12/465,537, filed May 13, 2009, in the name of the same inventors, co-pending with this regular patent application. This instant application claims priority of this latter regular patent application, and incorporates it by reference as if fully set forth herein.

For example and without limitation, an access point, as housed at least partly within the structure 46, might include four or more radios, including one or more scanning radios (with the effect that the access point can determine whether a particular channel is in use) and three or more communication radios.

One or more of the scanning radios, such as for example, each of them, might include two or more scanning antennae, disposed, such as for example, in a base portion of the structure 46, i.e., within the $1^{st}$ enclosure of the structure 46.

One or more of the communication radios, such as for example, each of them, might include a plurality of antennae, such as for example (and as shown in the figures), three or more patch antenna parts for each such communication radio. The communication radios might be disposed in a movable portion, i.e., within a $2^{nd}$ enclosure of the structure 46, such as for example (and as shown in the figures) in a 3×3 arrangement. The $2^{nd}$ enclosure might be coupled to the $1^{st}$ enclosure using, at least in part, a universal hinge part. As shown in the figures, in such cases in which the communication radios are disposed in a 3×3 arrangement, each set of antenna parts might be disposed in a selected row, with the effect that each row of the 3×3 arrangement is collectively included in a corresponding one of the communication radios.

The IEEE 802.11 family of standards differ sufficiently from each other that operation of one such standard, e.g., 802.11b, can interfere with operation of another such standard using a relatively nearby antenna. For example and without limitation, legacy systems, using standards such as 802.11a or 802.11b, can substantially affect operation of antennae using the relatively newer 802.11n standard.

In such cases, each such communication antenna might be disposed with a middle-row communication antenna being selected for use with IEEE standard 802.11b or 802.11g, while the two outer rows being selected for use with IEEE standard 802.11a (e.g., on a $1^{st}$ side) or for use with IEEE standard 802.11n (e.g., on a $2^{nd}$ side).

FIG. 3

FIG. 3 shows a $2^{nd}$ conceptual view of a structure housing a possible access point.

As shown in the FIG. 3 and the FIG. 4, the $1^{st}$ enclosure 48 might include a $1^{st}$ circuit board 34, and the $2^{nd}$ enclosure might include a $2^{nd}$ circuit board 36. The $1^{st}$ circuit board 34 and the $2^{nd}$ circuit board 36 might collectively provide for mounting or otherwise affixing antennae, circuits, shielding, and possibly other components for the system 10.

The system 10 might include one or more scanning antennae 20, one or more antenna patches 26, such as for example, antenna patches 28 and 30 (shown in the FIG. 3), and one or more shielding structures 32.

The FIG. 10, also described below, shows some possible elements that might function with these antenna parts. These possible elements include elements as shown in the FIG. 10, including at least a signal filter element 38, a signal modulation element 40, a network interface element 42, and a processing element 44.

The signal filter element 38, the signal modulation element 40, and the network interface element 42 might be mounted on the $1^{st}$ circuit board 34, the combination of which might be housed in the $1^{st}$ enclosure 48.

Figure 5:
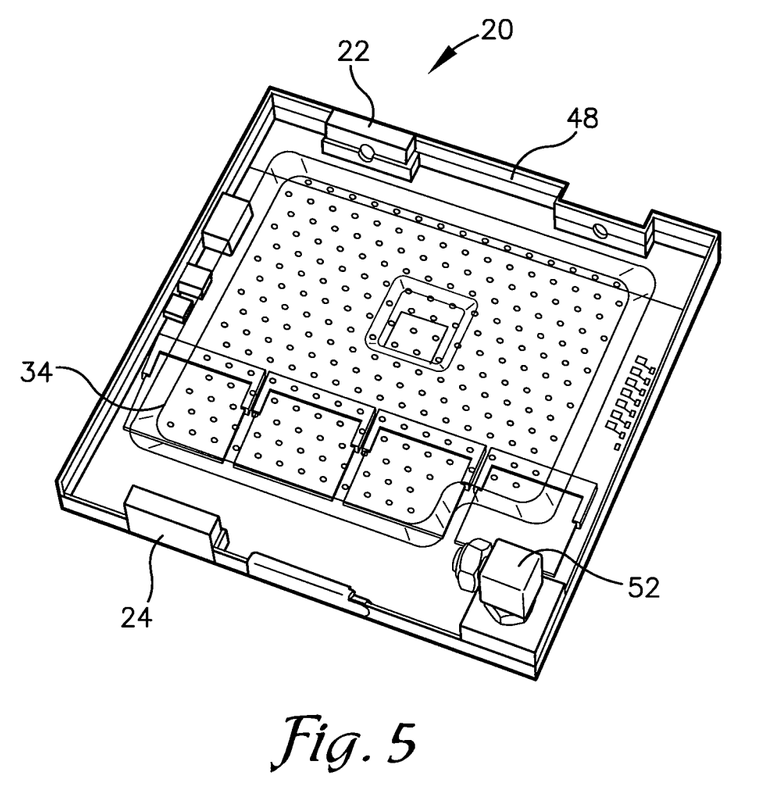
FIG. 5 shows a conceptual view of a possible enclosure in one of the structures shown in the FIG. 2, the FIG. 3, or the FIG. 4.

Alternatively, the $1^{st}$ enclosure might be disposed as shown in the FIG. 5. The antenna parts 26 (including antenna parts 28 and 30) and shielding structures 32 might be mounted on the $2^{nd}$ circuit board 36, which might be collectively disposed at least partly within the $2^{nd}$ enclosure 50.

FIG. 4

FIG. 4 shows a $3^{rd}$ conceptual view of a structure housing a possible access point.

As seen in the FIG. 4, the hinge component 52 might allow the $2^{nd}$ enclosure 50 to rotate approximately 180° about a $1^{st}$ axis 54 along an edge of the $1^{st}$ enclosure 48. The $2^{nd}$ enclosure 50 might also rotate approximately 360° about a $2^{nd}$ axis 56 along an edge of the $2^{nd}$ enclosure 50, with the effect that the $1^{st}$ axis 54 can be disposed substantially orthogonal to the $2^{nd}$ axis 56. This has the effect that the $2^{nd}$ enclosure 50 can be oriented at a substantial range of angles with respect to the $1^{st}$ enclosure 48. The $1^{st}$ enclosure 48 might be placed or mounted on a stationary object, such as a tabletop, a ledge, a wall, or a ceiling.

FIG. 5

FIG. 5 shows a conceptual view of a possible enclosure in one of the structures shown in the FIG. 2, the FIG. 3, or the FIG. 4.

The possible enclosure includes elements as shown in the FIG. 5, including at least one or more scanning antennae 20 (each of which might itself include a $1^{st}$ scanning antenna 22 and a $2^{nd}$ scanning antenna 24), a $1^{st}$ circuit board 34 (as described herein), a $1^{st}$ enclosure 48 (as described herein), and a hinge component 52.

Figures 6, 7:
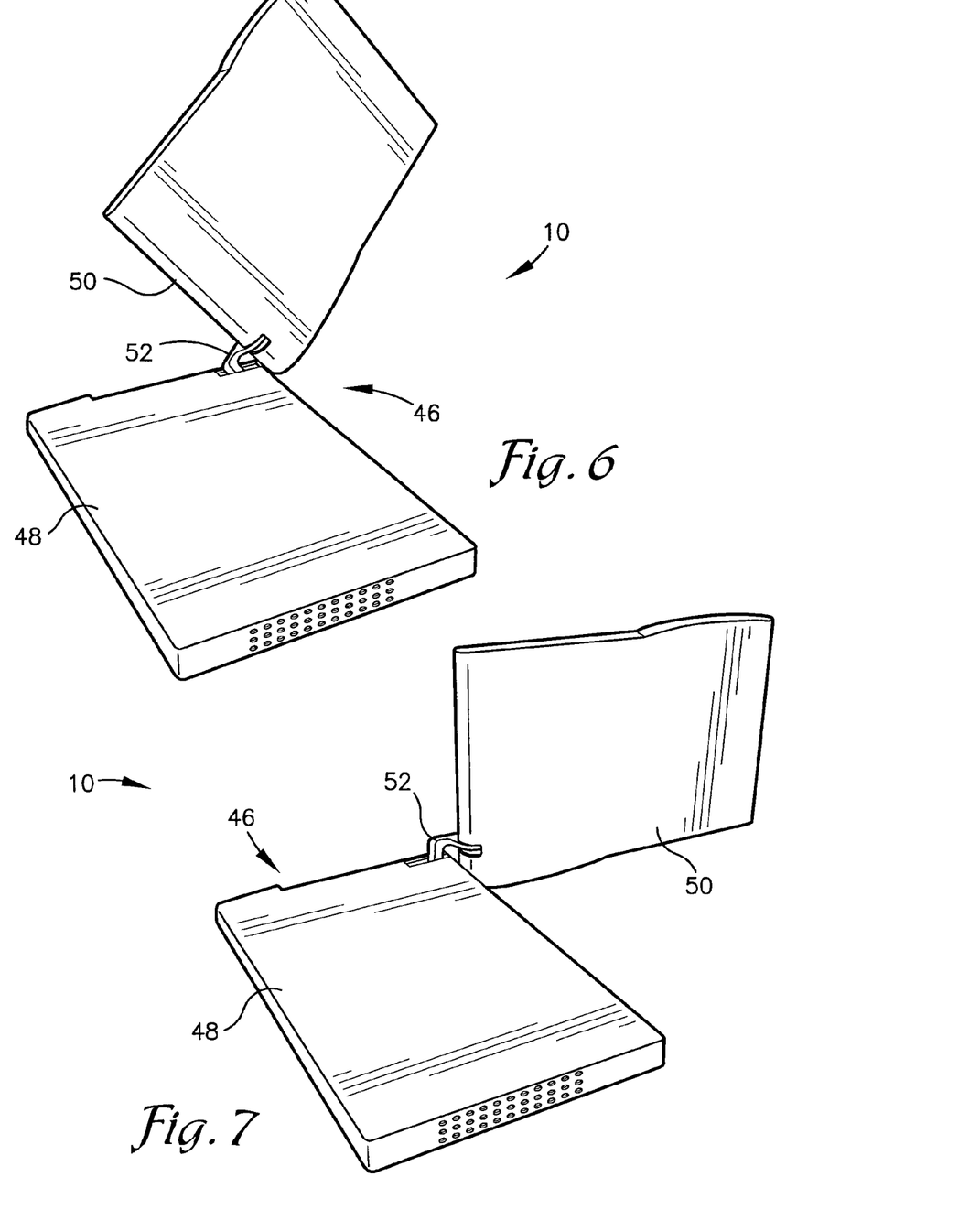
FIG. 6 shows a conceptual view of a possible rotational position between the $1^{st}$ enclosure and the $2^{nd}$ enclosure.
FIG. 7 shows a conceptual view of a possible rotational position between the $1^{st}$ enclosure and the $2^{nd}$ enclosure.

FIG. 6

FIG. 6 shows a conceptual view of a possible rotational position between the 1st enclosure and the $2^{nd}$ enclosure.

With the $1^{st}$ enclosure 48 properly positioned, the antenna patches 26 might be oriented by rotating the $2^{nd}$ enclosure 50 about the $1^{st}$ axis 54, the $2^{nd}$ axis 56, or both. Rotational positions between the $2^{nd}$ enclosure 50 and the $1^{st}$ enclosure 48 are shown in the FIG. 6 and the FIG. 7. The antenna patches 26 might be disposed to maximize signal coverage and throughput of the wireless communication network 14.

The scanning antennae 20 might scan for wireless signals associated with one or more carrier frequencies. In one embodiment, the scanning antennae 20 include a $1^{st}$ scanning antenna and a $2^{nd}$ scanning antenna 22, 24. The scanning antennae 20 search for wireless devices 16 that are transmitting but have not yet established a link with the access point antenna array system 10. In certain embodiments, the access point antenna array system 10 might be utilized in an IEEE 802.11 network. Thus, the carrier frequencies might include a 1st frequency of 2.4 GigaHertz (GHz) and a $2^{nd}$ frequency of 5 GHz.

The $1^{st}$ scanning antenna 22 might operate at the $1^{st}$ carrier frequency and might be located on one side of the $1^{st}$ enclosure 48. The $2^{nd}$ scanning antenna 24 might operate at the $2^{nd}$ carrier frequency and might be located on the opposite side of the $1^{st}$ enclosure 48 as shown in FIG. 5 with respect to antenna array system 20. This placement in the $1^{st}$ enclosure 48 offers spatial separation and signal isolation between the $1^{st}$ and $2^{nd}$ scanning antennae 22, 24. This or another arrangement can be used to mount such scanning antennae on antenna array system 10.

The antenna patches 26 might include one or more antennae 94 to transmit and receive wireless signals at one or more carrier frequencies. The individual antennae 94 might be square or rectangular-shaped and might be sized according the carrier frequency at which they radiate. Antennae 94 designed to operate at lower carrier frequencies might be larger in size than antennae 94 designed to operate at higher carrier frequencies. In certain embodiments, the access point antenna array system 10 might be utilized in an IEEE 802.11 network. Accordingly, some antennae 94 might be sized to operate at the $1^{st}$ carrier frequency of 2.4 GHz and some might be sized to operate at the $2^{nd}$ carrier frequency of 5 GHz. In various embodiments, the 5 GHz carrier frequency might include a plurality of subband carrier frequencies, with frequencies of 4.9 GHz, 5.185 GHz, 5.47 GHz, and 5.725 GHz. Each subband carrier frequency might include its own antenna 94. To conserve the space required for multiple antennae, the subband antennae might be stacked, one on top of another, according to size and carrier frequency, with the lowest frequency and largest sized antenna 94 on the bottom of the stack and the highest frequency and smallest sized antenna 94 on the top of the stack.

FIG. 7

FIG. 7 shows a conceptual view of a possible rotational position between the 1st enclosure and the $2^{nd}$ enclosure.

The antenna patches 26 might be divided into a plurality of groups based on the fundamental carrier frequency at which they operate. In certain embodiments, the antenna patches 26 might be divided into a $1^{st}$ group associated with the $1^{st}$ carrier frequency and a $2^{nd}$ group associated with the $2^{nd}$ carrier frequency. The antenna patches 26 of a given group might be placed on the $2^{nd}$ circuit board 36 in close proximity of each other, between approximately 1 inch to approximately 3 inches, but separated from antenna patches 26 of another group. The antenna patches 26 within a group might be placed in a pattern, such as a horizontal, vertical, or diagonal line, as shown in the FIG. 3 and the FIG. 8. The $1^{st}$ and $2^{nd}$ groups might be arranged on the $2^{nd}$ circuit board 36 in an alternating fashion, such that a $1^{st}$ group of antenna patches 28 is positioned adjacent to a $2^{nd}$ group of antenna patches 30 and not positioned next to another $1^{st}$ group. Likewise, a $2^{nd}$ group of antenna patches 30 is positioned next to a $1^{st}$ group of antenna patches 28 only. In various embodiments, the antenna patches 26 might mounted to both sides of the $2^{nd}$ circuit board 36, using the techniques as described above. Placement of the array of antenna patches 26 on the $2^{nd}$ circuit board 36 in the $2^{nd}$ enclosure 50 also establishes separation of the antenna patches 26 from the scanning antennae 20, located on opposite sides of the $1^{st}$ enclosure 48.

The shielding structures 32 provide signal isolation between the $1^{st}$ and $2^{nd}$ groups of antenna patches 28, 30. Each shielding structure 32 might be formed from an elongated strip of grounded electrically conductive material, such as copper or other metals. Once the $1^{st}$ and $2^{nd}$ groups of antenna patches 28, 30 are placed on the $2^{nd}$ circuit board 36, as discussed above, the shielding structures 32 are placed on the circuit board 36 in between the $1^{st}$ and $2^{nd}$ groups 28, 30. In certain embodiments, such as the one shown in FIGS. 3 and 8, the shielding structure 32 might be formed from a thin strip of copper that is mounted to the $2^{nd}$ circuit board 36. Mounting techniques might include soldering, as is known in the art. The length of the shielding structure 32 might match one of the planar dimensions of the circuit board 36, such as the width, and the height might be sufficient to provide signal isolation without causing interference with the $2^{nd}$ enclosure 50. In various embodiments, the shielding structures 32 might be mounted on both sides of the $2^{nd}$ circuit board 36 using the techniques as described above.

Figure 8:
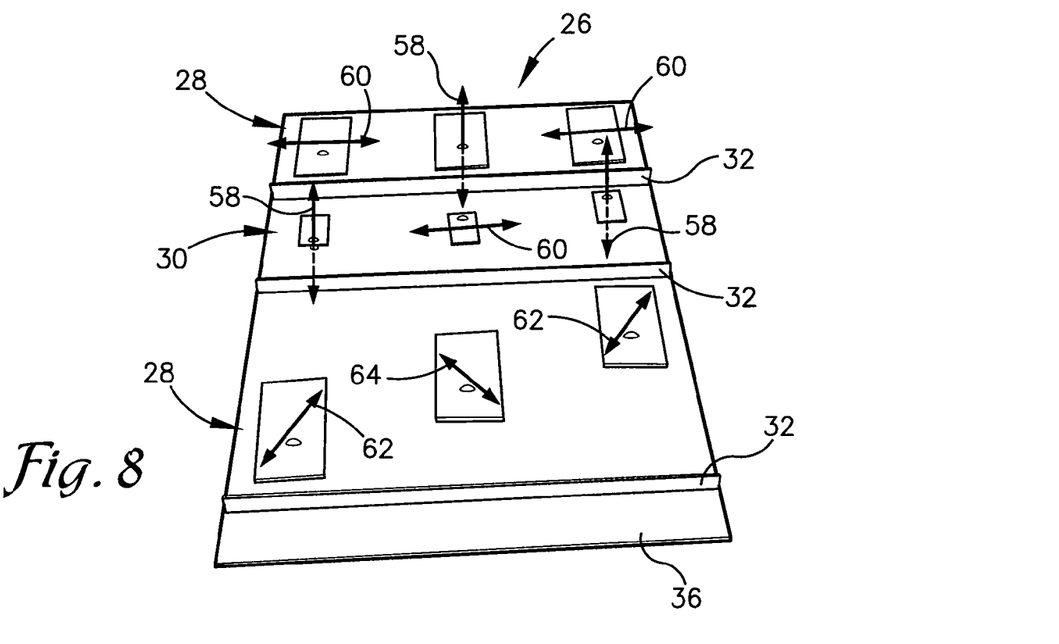
FIG. 8 shows an arrangement of antenna parts with selected polarization orientations.

FIG. 8

FIG. 8 shows an arrangement of antenna parts with selected polarization orientations.

Each antenna patch 26 might be polarized with a $1^{st}$ polarization 58 or a $2^{nd}$ polarization 60, that is generally orthogonal to the $1^{st}$ polarization 58, as shown in FIG. 8. In certain embodiments, the $1^{st}$ polarization 58 might be a vertical, or up/down, polarization, and the $2^{nd}$ polarization 60 might be a horizontal, or left/right, polarization, or vice versa. Alternatively, the $1^{st}$ polarization 58 might be along a diagonal 62, e.g. NE/SW or NW/SE, and the $2^{nd}$ polarization 60 might be along an orthogonal diagonal 64, e.g. NW/SE or NE/SW, respective to the $1^{st}$ polarization 58. In other embodiments, a circular polarization might also be utilized. When placing antenna patches 26 within a group on the $2^{nd}$ circuit board 36, an antenna patch 26 of the $1^{st}$ polarization 58 is placed adjacent to an antenna patch 26 of the $2^{nd}$ polarization 60 in an alternating pattern.

Figure 9:
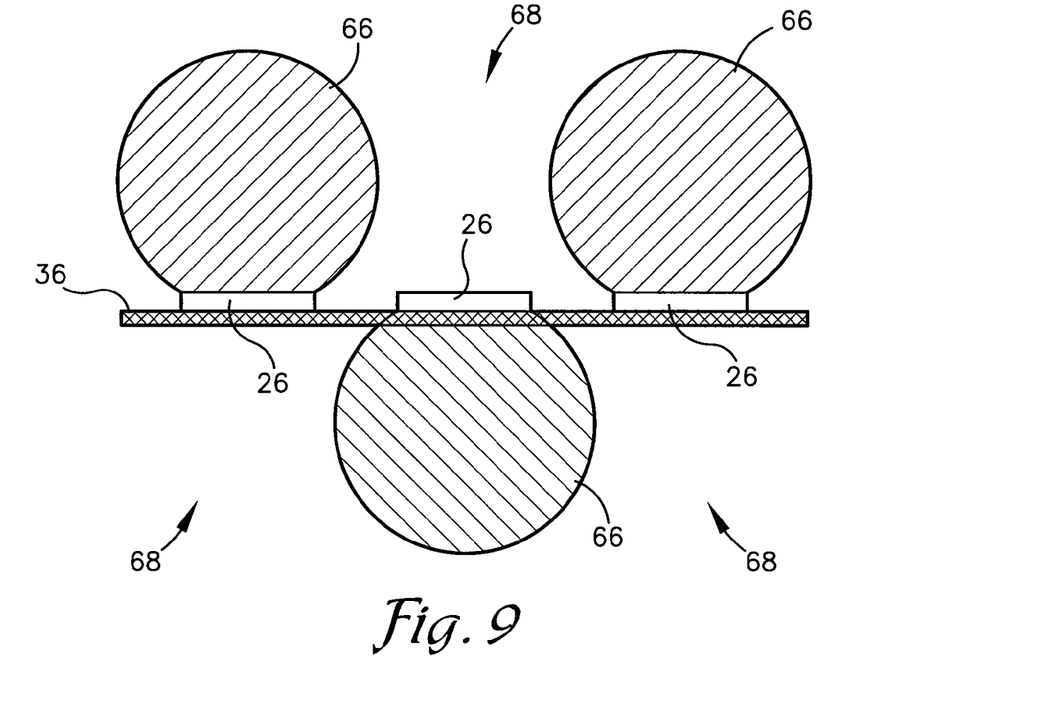
FIG. 9 shows a conceptual view of a possible radiation pattern, including possible active regions and possible null regions.

FIG. 9

FIG. 9 shows a conceptual view of a possible radiation pattern, including possible active regions and possible null regions.

Each antenna patch 26 might have a radiation pattern with active radiating regions 66 and null radiating regions 68 in the space around the antenna patch 26, as seen in FIG. 9. The active region 66 is the space in which the antenna is radiating and the null region 68 is generally everywhere else. The antenna patches 26 might be oriented on the circuit board such that the active radiating region 66 of one antenna patch 26 is located in the null region 68 of an adjacent antenna patch 26 to reduce signal interference from one antenna patch 26 to another antenna patch 26.

Figure 10:
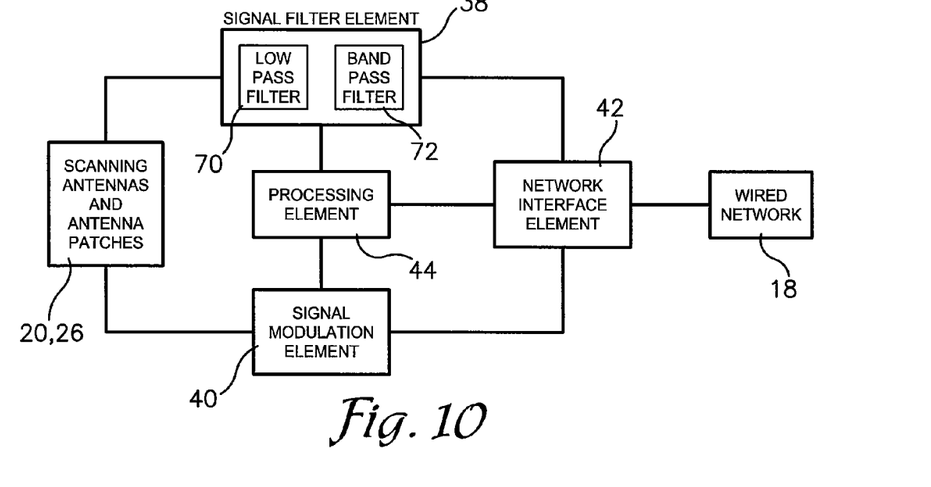
FIG. 10 shows a conceptual view of a signal filter element.

FIG. 10

FIG. 10 shows a conceptual view of a signal filter element.

The signal filter element 38 generally filters signals at the $1^{st}$ carrier frequency. As seen in the FIG. 10, the signal filter element 38 might include a plurality of low-pass filter circuits 70 and a plurality of band-pass filter circuits 72. Both filter circuits 70, 72 might include analog or digital circuitry or combinations thereof. The filter circuits 70, 72 might be formed from discrete passive and active components, fully-custom or semi-custom application-specific integrated circuits (ASICs), digital signal processing circuits (DSPs), microprocessors, microcontrollers, field-programmable gate arrays (FPGAs), and the like, or combinations thereof.

Wireless signals are received by the antenna patches 26 and forwarded to the signal filter element 38. Typically, the $1^{st}$ carrier frequency is lower than the $2^{nd}$ carrier frequency so that signals modulated at the $2^{nd}$ carrier frequency can be filtered out by the low-pass filter 70 whose cutoff frequency is designed to be less than the $2^{nd}$ frequency. In certain embodiments, the access point antenna array system 10 might be used with an IEEE 802.11 system, so that the $2^{nd}$ frequency might be 5 GHz, thus the cutoff frequency of the low-pass filter 70 might be approximately 3 GHz. The low-pass filtered signal is forwarded to the band-pass filter 72, which might help to filter noise and other undesirable effects on the signal. In certain embodiments, the center frequency of the band-pass filter 72 might be the 1st carrier frequency, which for IEEE 802.11 might be approximately 2.4 GHz. The output of the band pass filter 72 is forwarded to the network interface element 42.

Figure 11:
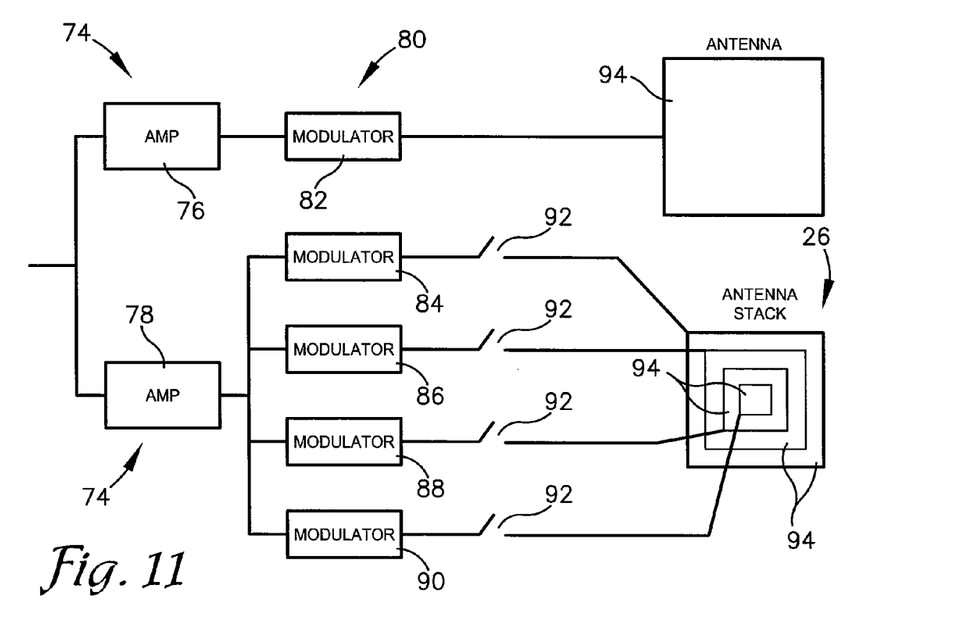
FIG. 11 shows a conceptual view of a signal modulation element.

FIG. 11

FIG. 11 shows a conceptual view of a signal modulation element.

The signal modulation element 40 generally modulates the signals at the $1^{st}$ and 2nd carrier frequencies. The signal modulation element 40, shown in the FIG. 11, includes a plurality of power amplifiers 74, a plurality of modulators 80, and a plurality of switches 92. The power amplifier 74 might include analog or digital circuitry or combinations thereof, and might be formed from discrete passive and active components, fully-custom or semi-custom ASICs, or combinations thereof. The modulators 80 might include analog or digital circuitry or combinations thereof, and might be formed from discrete passive and active components, fully-custom or semi-custom ASICs, DSPs, microprocessors, microcontrollers, FPGAs, and the like, or combinations thereof. The switches 92 might include analog or digital circuitry or combinations thereof, and might be formed from discrete passive and active components.

The signal modulation element 40 might be forwarded data from the network interface element 42 to be transmitted wirelessly at either the $1^{st}$ or the $2^{nd}$ carrier frequencies. In certain embodiments, the access point antenna array system 10 might be used in an IEEE 802.11 system. Thus, the $1^{st}$ carrier frequency might be 2.4 GHz and the $2^{nd}$ carrier frequency might be 5 GHz with subband carrier frequencies at 4.9 GHz, 5.185 GHz, 5.47 GHz, and 5.725 GHz.

As seen in the FIG. 11, the signal might be amplified by a $1^{st}$ amplifier 76 for a 2.4 GHz signal or a $2^{nd}$ amplifier 78 for a 5 GHz signal. From the $1^{st}$ amplifier 76, the signal is modulated by a $1^{st}$ modulator 82 that is connected to a 2.4 GHz antenna. From the $2^{nd}$ amplifier 78, the signal is modulated by 2nd, third, fourth, and fifth modulators 84, 86, 88, 90 to modulate at 4.9 GHz, 5.185 GHz, 5.47 GHz, and 5.725 GHz, respectively. Each of these modulators 84, 86, 88, 90 is connected through a single-pole, single-throw type switch 92 to an antenna patch stack 26, wherein the $2^{nd}$ modulator 84 is connected to the lowest antenna 94 and the fifth modulator 90 is connected to the highest antenna 94. The output of the modulators 80 might pass to an antenna patch 26 if the switch 92 is closed, or might be blocked if the switch 92 is open.

The network interface element 42 generally manages data flow between the signal filter 38 and signal modulation elements 40 and the wired network 18. The network interface element 42 might receive data from the wired network 18 and forward a corresponding signal to the signal modulation element 40. The network interface element 42 might also receive a signal from the signal filter element 38 and forward corresponding data to the wired network 18. The network interface element 42 might include one or more components to process data and generate and receive signals for one or more layers of the transmission control protocol/Internet protocol (TCP/IP) layering model, particularly the data link layer and the physical layer. The network interface element 42 might include analog or digital circuitry or combinations thereof, and might be formed from discrete passive and active components, fully-custom or semi-custom ASICs, DSPs, microprocessors, microcontrollers, FPGAs, and the like, or combinations thereof. The network interface element 42 might couple to wired networks 18 of varying protocols, topologies, and architectures, as well as physical media, such as coaxial cable and shielded or unshielded twisted pair cable. Furthermore, the network interface element 42 might include optical receiving and driving components in order to couple with optical fiber.

The processing element 44 controls and monitors the operations of the signal filter element 38, the signal modulation element 40, and the network interface element 42. The processing element 44 might also establish the timing of various receiving and transmitting events. The processing element 44 might include analog or digital circuitry or combinations thereof. The processing element 44 might also be described in one or more code segments of a hardware description language, such as VHDL or Verilog, and might be implemented in fully-custom or semi-custom ASICs, DSPs, microprocessors, microcontrollers, FPGAs, other programmable logic devices, and the like, or combinations thereof.

Figure 12A:
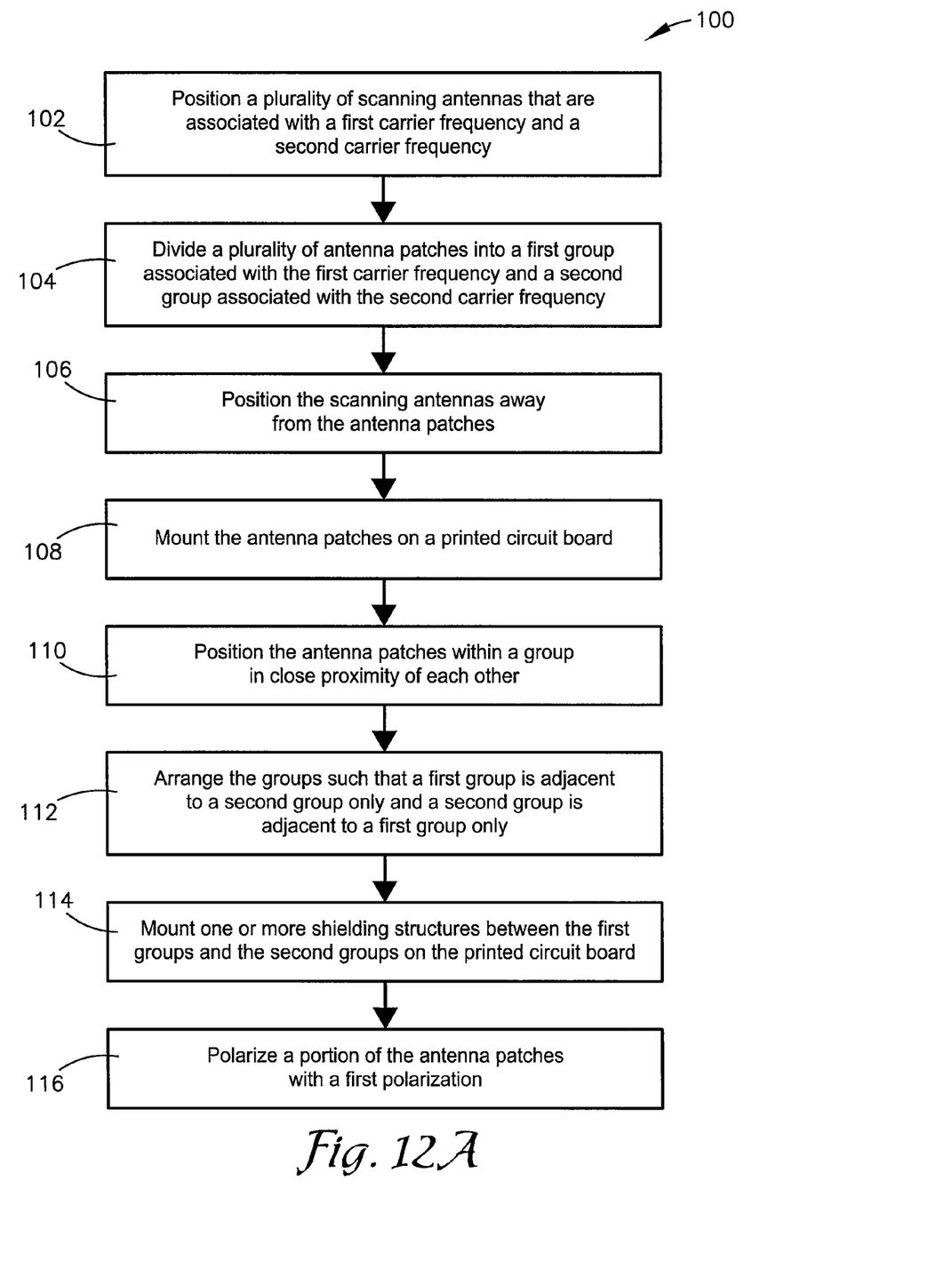
FIG. 12 shows a conceptual diagram of an example process flow used in an example wireless communication system.
Figure 12B:
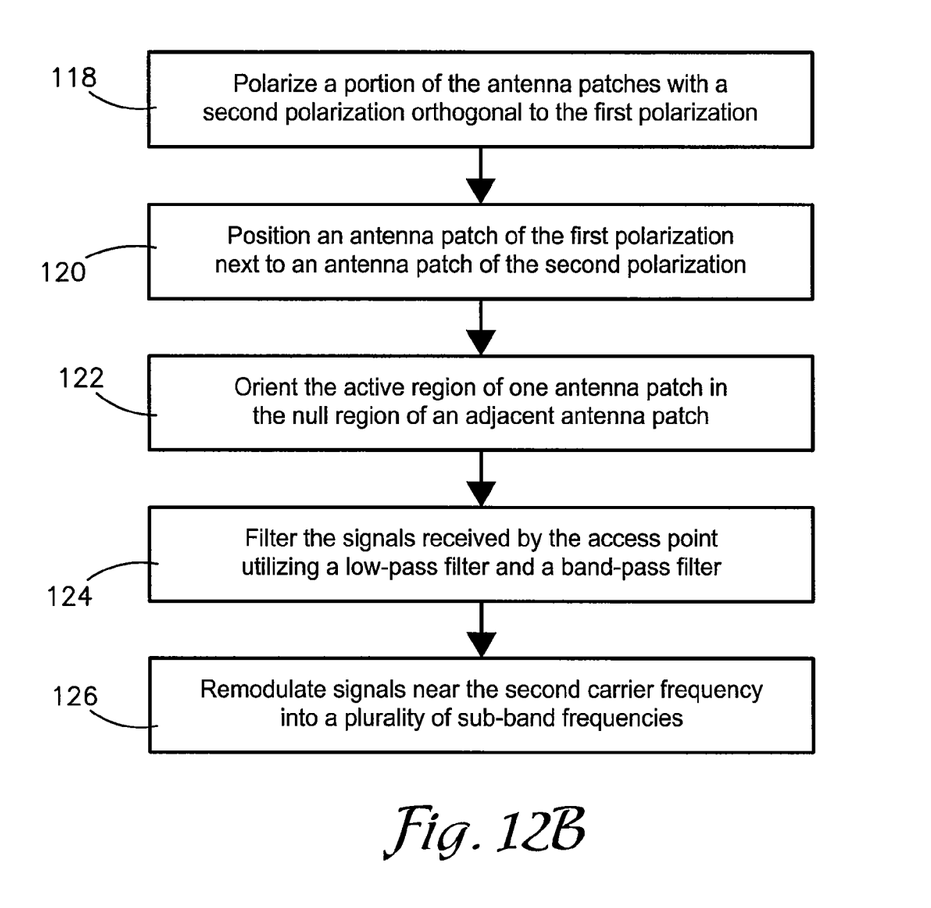

FIG. 12

FIG. 12 shows a conceptual diagram of an example process flow used in an example wireless communication system.

Some steps 100 of a method of maximizing signal throughput in a multiple-input, multiple-output wireless communication network 14 utilizing various embodiments of the access point antenna array system 10 is shown in FIG. 12. The steps 100 as shown in FIG. 12 do not imply an order of execution. Some steps might be performed concurrently with or before other steps as shown in the flow diagram.

In step 102, a plurality of scanning antennae 20 is positioned, wherein the scanning antennae 20 scan for signals associated with a $1^{st}$ carrier frequency and a $2^{nd}$ carrier frequency.

In step 104, a plurality of antenna patches 26 is divided into a $1^{st}$ group 28 associated with a $1^{st}$ carrier frequency and a $2^{nd}$ group 30 associated with a $2^{nd}$ carrier frequency. Typically, the $1^{st}$ carrier frequency is less than the $2^{nd}$ carrier frequency. In certain embodiments, the access point antenna array system 10 is utilized in an IEEE 802.11 system, wherein the $1^{st}$ carrier frequency is 2.4 GHz and the $2^{nd}$ carrier frequency is 5 GHz.

In step 106, the scanning antennae 20 are positioned away from the antenna patches 26 to avoid interference between the antenna patches 26 and the scanning antennae 20.

In step 108, the $1^{st}$ and $2^{nd}$ groups of antenna patches 28, 30 are mounted on a circuit board 36.

In step 110, the antenna patches 26 within a group are positioned in close proximity of each other, typically in a pattern, such as a horizontal, vertical, or diagonal line.

In step 112, the groups are arranged such that a $1^{st}$ group is adjacent to a $2^{nd}$ group only and a $2^{nd}$ group is adjacent to a $1^{st}$ group only in an alternating pattern. One or more shielding structures 32 is mounted on the circuit board 36 between the $1^{st}$ and $2^{nd}$ groups of antenna patches 28, 30 in step 114. The shielding structures 32 might be sized to match one of the planar dimensions of the circuit board 36, such as the length or width.

In step 116, a portion of the antenna patches 26 might be polarized with a $1^{st}$ polarization 58.

In step 118, a portion of the antenna patches 26 might be polarized with a $2^{nd}$ polarization 60. Generally, the $1^{st}$ polarization 58 is orthogonal to the $2^{nd}$ polarization 60. For example, the $1^{st}$ polarization 58 might be a vertical, or up/down, polarization, and the $2^{nd}$ polarization 60 might be a horizontal, or left/right, polarization, or vice versa.

In step 120, the antenna patches 26 of the $1^{st}$ polarization 58 are positioned next to antenna patches 26 of the $2^{nd}$ polarization 60 in an alternating fashion.

In step 122, the active radiating region 66 of one antenna patch 26 is oriented to occupy the null region 68 of an adjacent antenna patch 26. This step might be performed while mounting the antenna patches 26 to the circuit board.

In step 124, the signals received by the access point antenna array system 10 might be filtered by a low-pass filter 70 followed by a band-pass filter 72. The low-pass filter 70 might have a cutoff frequency that is less than the $2^{nd}$ carrier frequency, thereby filtering out signals of the $2^{nd}$ carrier frequency. The band-pass filter 72 might have a center frequency of approximately the $1^{st}$ carrier frequency. In certain embodiments, the $1^{st}$ and $2^{nd}$ carrier frequencies might be those used in an IEEE 802.11 system, which are 2.4 GHz and 5 GHz, respectively.

In step 126, signals might be remodulated near the $2^{nd}$ carrier frequency into a plurality of sub-band frequencies, utilizing a power amplifier 74, a plurality of modulators 80, and a plurality of switches 92. Signals are amplified by the power amplifier 74 and modulated by the plurality of modulators 80. Some modulators modulate below the $2^{nd}$ carrier frequency, and others modulate above the $2^{nd}$ carrier frequency. The signals from the modulators might be forwarded to a plurality of switches 92, which might block the signals from the antenna patches 26 or pass the signals to the antenna patches 26.

ALTERNATIVE TECHNIQUES

After reading this application, those of ordinary skill in the art would recognize that the scope and spirit of the invention is not limited in any way by the specific examples described herein, and that further and other techniques would not require undue experimentation or new invention.

The invention claimed is:

1. An access point with multiple antennae for concurrent communication in a wireless network, comprising: a first set of antennae; a second set of antennae located in a null region of the first set of antennae and relative to the first set of antennae and concurrently communicates while the sets of antennae remain isolated during concurrent communication using distinct protocols at distinct frequencies, the first and second sets of antennae located in a first enclosure; and at least two scanning antennae to locate stations operating concurrently with the first and second sets of antennae at the distinct frequencies and located in a second enclosure, wherein the second enclosure is independently rotatable from the first enclosure on at least two axes to reduce interference between the at least two scanning antennae and the first and second set of antennae.

2. The access point of claim 1, wherein one or more antennae within the first or second sets of antennae are disposed to communication at two or more carrier frequencies, wherein each of the first set of antenna are adjacent to each of the second set of antenna on a common circuit board and operate at distinct carrier frequencies.

3. The access point of claim 2, wherein the first set of antennae operate at a lower frequency than the second set of antennae.

4. The access point of claim 1, comprising: one or more antennae from the first or second sets of antennae disposed to communicate using two or more distinct protocols, wherein each of the first set of antenna adjacent to the second set antenna operate at distinct protocols.

5. The access point of claim 1, wherein a first frequency of the distinct frequencies is used by a first communication protocol but not a second communication protocol of the distinct protocols.

6. The access point of claim 1, comprising two or more of: the first set of antenna disposed in a null region of the second set of antenna; the first set of antenna disposed to communicate polarized and orthogonal to a second antenna; at least one of the first and second sets of antennae disposed to each of the first set of antenna adjacent to the second set of antenna operate at distinct carrier frequencies; at least one of the first and second sets of antennae disposed to communicate using two or more distinct protocols, wherein each of the first set of antenna adjacent to the second set of antenna operate at distinct protocols.

7. The access point of claim 1, comprising: a first antenna disposed to communicate polarized and orthogonal to a second antenna.

8. The access point of claim 1, wherein two or more of the first or second sets of antennae are each disposed in a plurality of collinear parts.

9. The access point of claim 8, comprising: an isolation barrier between the two or more of the first or second sets of antennae, that barrier being collinear with at least one of those two or more of those antennae.

10. The access point of claim 1, further comprising: a moveable hinge between the first and second enclosures allowing independent rotation around the at least two axes for positioning in the null regions.

11. The access point of claim 1, wherein the first and second sets of antennae are located in a null region of a co-located access point.

12. The access point of claim 1, wherein the distinct protocols comprise distinct IEEE 802.11-type protocols.

13. A method in an access point with multiple antennae for concurrent communication in a wireless network, the method comprising: operating a first set of antennae and a second set of antennae with the second set of antennae located in a null region of the first set of antennae; isolating the first set of antennae from the second set of antennae while during concurrent communications using different protocols at distinct frequencies, the first and second sets of antennae and a third set of antennae located in a first enclosure; and operating at least two scanning antennae to locate stations concurrently with the first, second and third sets of antennae at the distinct frequencies and located in a second enclosure, wherein the second enclosure is independently rotatable from the first enclosure on at least two axes to reduce interference between the at least two scanning antennae and the first, second and third sets of antennae.

14. The method of claim 13, wherein isolating further comprises two or more of: disposing the first set of antenna in a null region of the second set of antenna; disposing the first set of antenna to communicate polarized and orthogonal to the second set of antenna; disposing a set of antennae to communicate at two or more carrier frequencies, wherein each the first set of antenna adjacent to the second set of antenna operate at distinct carrier frequencies; disposing a set of antennae to communicate using two or more distinct protocols, wherein each the first set of antenna adjacent to the second set of antenna operate at distinct protocols.

15. The method of claim 12, wherein two or more of the first, second and third sets of antennae are each disposed in a plurality of substantially collinear parts.

16. The method of claim 13, further comprising: disposing a barrier to isolate the first and second set of antennae, the barrier being collinear with at least one of the sets of antennae.

17. An access point with multiple antennae for concurrent communication in a wireless network, comprising: a first set of antennae; a second set of antennae located adjacent to the first set of antennae and in a null region of the first set of antennae and concurrently communicates relative to the first set of antennae, while the sets antennae remain isolated during concurrent communication using distinct protocols at distinct frequencies; and a third set of antennae located adjacent to the second set of antennae, apart from the first set of antennae, and in a null region of the second set of antennae, communicating using the same protocol and frequency as the first set of antennae, the first, second and third sets of antennae located in a first enclosure; and at least two scanning antennae to locate stations operating concurrently with the first, second and third sets of antennae at the distinct frequencies and located in a second enclosure, wherein the second enclosure is independently rotatable from the first enclosure on at least two axes to reduce interference between the at least two scanning antennae and the first, second and third sets of antennae.

* * * * *